United States Patent [19]

Hager

[11] Patent Number: 5,538,395
[45] Date of Patent: Jul. 23, 1996

[54] THERMOPLASTIC PUMP ROTOR

[75] Inventor: Daniel Hager, Farges les Chalon, France

[73] Assignee: Ozen S.A., France

[21] Appl. No.: 217,503

[22] Filed: Mar. 24, 1994

[30] Foreign Application Priority Data

Mar. 25, 1993 [FR] France .................................. 93 03640

[51] Int. Cl.⁶ ..................................................... F04D 29/22
[52] U.S. Cl. ................. 416/144; 416/186 R; 416/241 A; 156/73.1
[58] Field of Search .............................. 416/144, 186 R, 416/213 A, 241 A; 156/73.1

[56] References Cited

U.S. PATENT DOCUMENTS

| 2,902,941 | 9/1959 | Kiba | 416/186 R |
|---|---|---|---|
| 3,265,001 | 8/1966 | Deters | 416/241 A |
| 3,408,944 | 11/1968 | Belonger et al. | 416/241 A |
| 3,477,384 | 11/1969 | Hlinka | 416/186 R |
| 3,541,607 | 11/1970 | Greene | 416/186 R |
| 3,730,641 | 5/1973 | Gordon | 416/241 A |

FOREIGN PATENT DOCUMENTS

| 1935013 | 1/1971 | Germany | 416/241 A |
|---|---|---|---|
| 24128 | 10/1969 | Japan | 416/144 |
| 56-15318 | 2/1981 | Japan | 156/73.1 |
| 70094 | 4/1983 | Japan | 416/241 A |
| 1-160634 | 6/1989 | Japan | 156/73.1 |
| 118299 | 5/1993 | Japan | 416/241 A |
| 7512956 | 5/1976 | Netherlands | 156/73.1 |

OTHER PUBLICATIONS

Branson Technical Information PW-3, "Joint Design For Ultrasonic Welding", Branson Sonic Power Company, 2 pages. Aug. 1980.

Primary Examiner—James Larson
Attorney, Agent, or Firm—Ostrolenk, Faber, Gerb & Soffen

[57] ABSTRACT

A pump rotor for displacing fluids includes a cover and a bottom part having blades. Both the bottom part and the cover are formed by injection molding of thermoplastic materials, preferably reinforced by fillers. The bottom part and the cover are joined together by welding. The walls of the bottom part and cover are sufficiently thin to replace similar metal parts and to provide maximum benefit of the skin effect resulting from the specific surface qualities of the molded material forming the bottom part and the cover. A mold for molding the bottom part and the cover is equipped with a cap which is angularly and vertically adjustable making it possible for a balancing weight to be fitted on the molded parts. The balancing weight is also angularly adjustable and has an adjustable mass.

8 Claims, 6 Drawing Sheets

THERMOPLASTIC PUMP ROTOR

BACKGROUND OF THE INVENTION

1. Field of the Invention

The present invention relates to pump rotors including walls of relatively small thickness and made of injected thermoplastic material for the displacement of different fluids (oils, greases, hydrocarbons, air, and the like). The present invention also relates to a process of manufacturing the pump rotors described above.

2. Description of the Prior Art

Pump rotors made of metal walls of small thickness, for instance, by assembling parts cut from a metal sheet or produced by precision pressure casting, are well known. It is tempting for the person skilled in the art to replace the metal in these products by plastic, a material which is more inert chemically and less dense. Thus, forming the rotor of plastic makes it possible to reduce the mass of the moving parts of the rotor and less expensive to manufacture, thereby making it possible to reduce the total cost. However, parts made of plastic have less mechanical strength than metal parts, thereby creating a need for walls of increased thickness when forming the walls of plastic. In addition, parts made of plastic are not as dimensionally precise as parts made of thin metal. Plastic parts also have poorer thermal stability and durability than metal parts.

It is also difficult to obtain an assembled unit which is satisfactorily and permanently balanced whether one uses metal parts or molded parts. It is usually necessary to individually balance each of the rotor parts after assembly.

The technique of monobloc injection of plastic materials with fusible cores would make it possible to obtain suitable shapes of blades for this type of rotor (hollow shapes, warp shapes and undercut shapes). However, such a technique would not be precise enough to assure relatively constant, small wall thicknesses. Here again, the problem of balancing would arise in the case of rotors rotating at high speed (more than 1000 rpm, for instance). French 2 604 116, which relates to a process for manufacturing an impeller wheel for a coolant pump of an automotive vehicle is one example of this technology.

SUMMARY OF THE INVENTION

The object of the present invention is to overcome the above-mentioned drawbacks by providing pump rotors made of two parts which are assembled by welding, both parts being obtained by injection molding from suitable thermoplastic materials, preferably filled materials. Preferably, the walls of the molded parts are sufficiently thin to replace similar parts made of metal and are formed to provide maximum benefit of the skin effect resulting from the molding of the surface finish of the material used to form the walls of small thickness.

In accordance with one advantageous arrangement of the present invention, the types of materials preferred for the production of these two parts are polyamides (6,6 or 6,10 or 6,4 or 11,12), polyarylamides, polyetherketones, polyphenylene sulfides, polypropylenes and polyphthalamides, preferably reinforced with between 10% and 60% by weight of glass fibers, Kevlar fibers or carbon fibers, without this enumeration being limitative. The wall thicknesses that are obtained are about one millimeter or less.

The injection of these two parts may be advantageously effected in accordance with the present invention by multiple injection points, distributed uniformly over the periphery of a central hub. Preferably, the ports are sufficient in number so that the paths of the material are rather short up to the lines where the layers join each other. Alternatively, the two parts can be injected through a diffusion layer created by a flow striction zone around a central ring formed on each part, the flow striction zone being normally fed with material at one or more points.

In accordance with another advantageous arrangement of the present invention, the two parts thus obtained are assembled by ultrasonic welding. Preferably, energy directors in the form of triangular beads are provided so as to terminate on the upper edges of the blades of the bottom part to facilitate the ultrasonic welding.

Furthermore, the two molded parts are advantageously provided with a balancing weight which is integrally molded with the two parts. The angular position and the mass of the balancing weight can be adjusted as desired by an adjustable device provided on production molds. This feature completely eliminates the problem of individual balancing of the rotors, which problem is present in the prior technologies.

Furthermore, the rotors in accordance with the present invention can have at a central part thereof a drive system which can be formed on one of the two parts during the molding process, or be metallic and attached to the one of the two parts.

Finally, it may be advantageous for technical or economic reasons to have the two component parts of the rotors in accordance with the invention be formed of two different materials, provided that these materials are compatible for assembly by ultrasonic welding.

BRIEF DESCRIPTION OF THE DRAWINGS

The present invention will be better understood from a reading of the following detailed description of embodiments of pump rotors according to the invention which are illustrated in the accompanying drawings, given by way of illustration and not of limitation, in which:

FIG. 2b is a sectional view through a cover formed to be received on the bottom part shown in FIG. 2a;

FIG. 3b is a sectional view through a cover formed to be received on the bottom part shown in FIG. 3a;

DETAILED DESCRIPTION OF PREFERRED EMBODIMENTS

Figure 1A:
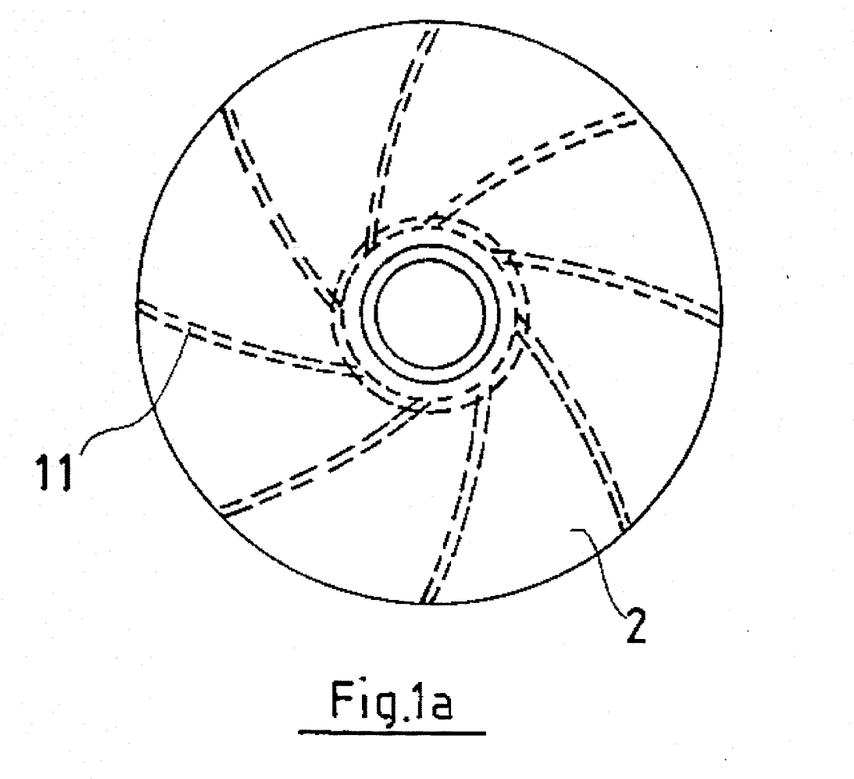
FIG. 1a is a top view of a pump rotor according to the present invention.
Figure 1B:
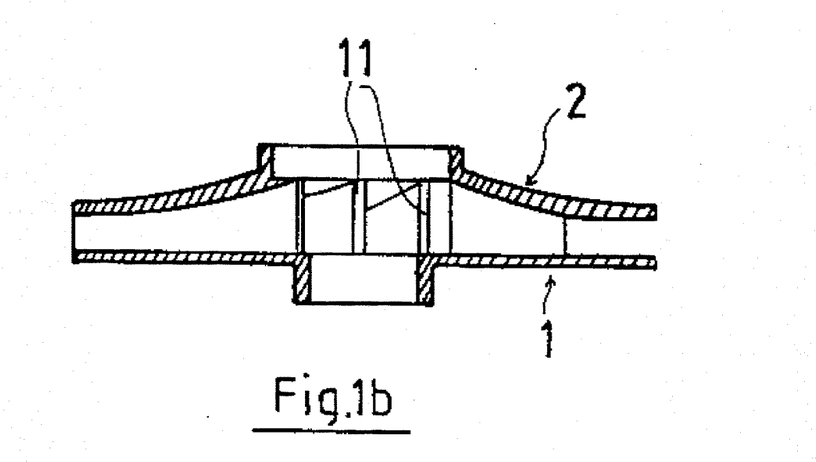
FIG. 1b is a sectional view through an assembled pump rotor in accordance with the present invention.

Referring to FIGS. 1a and 1b, it is seen that a pump rotor in accordance with the invention is formed of two assembled parts, namely a bottom 1 and a cover 2, which are shown in detailed cross section in FIG. 1b. Two other embodiments are shown in FIGS. 2a and 2b and in FIGS. 3a and 3b, respectively.

Figure 2A:
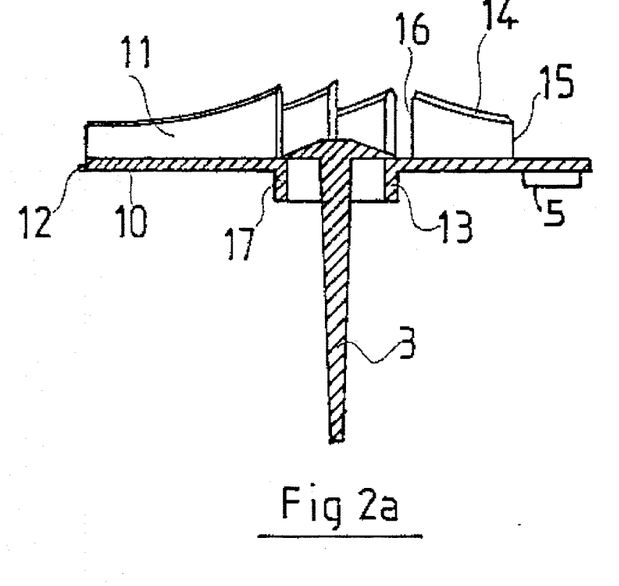
FIG. 2a is a sectional view through a first embodiment of a bottom part of the pump rotor including a plurality of blades.

As can be noted from FIG. 2a, the bottom 1 comprises a disk 10 on top of which there is a series of blades 11 which are integrally formed with the disk. The shape of the disk may, for instance, be curved or helicoidal in accordance with the requirements, in order to improve or optimize the efficiency of the rotor, particularly as a function of the nature of the fluid to be propelled. In certain cases, when removal from the mold may raise problems, the disk 10 may advantageously be provided on its periphery and in its plane with a narrow annular ring 12 projecting from the blades 11 in order to permit the use of an annular ejector 110 shown in FIG. 7. As will be described below, the annular ejector 110 facilitates the extraction of the part from its cavity at the end of the molding process without interfering with the rotation of the part resulting from the axial displacement converted into rotation as a result of the shape of the blades 11.

The bottom 1 is also provided in its center, in conventional manner, with a hub 13 which can advantageously be provided with a drive system of known type such as, for instance, a threaded region or a keying or a polygon or the like, obtained directly upon molding, or else a part, of metal or the like, inserted, surmounted or attached in accordance with the known techniques.

Figure 2B:
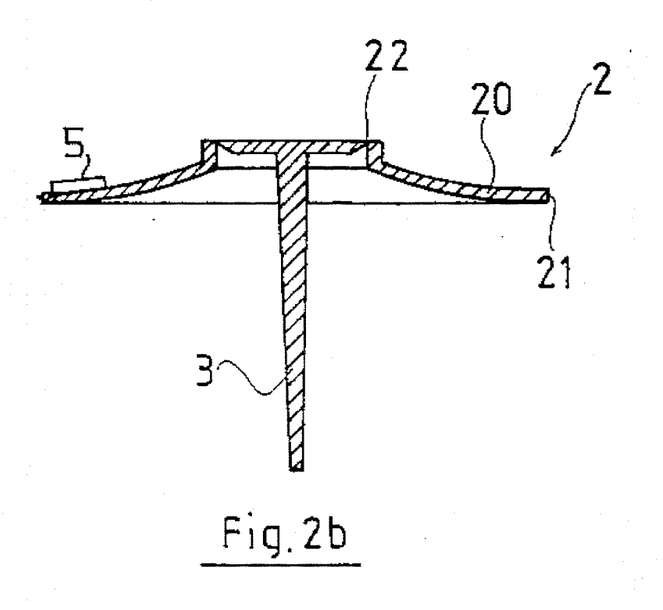

FIG. 2b shows the cover 2, which is the part complementary to the bottom 1. The cover 2 includes a thin circular disk 20 having the general shape of a cap generated by revolution around a vertical axis is such that it substantially corresponds to the curvature of the upper edges 14 of the blades 11 of the bottom 1. The outside diameter 21 of the cover 2 coincides substantially with that defined on the disk 10 of the bottom 1 by the outer edges 15 of the blades 11, while its inside diameter 22 coincides substantially with that defined in the same manner by the inner edges 16 of these same blades 11.

Figure 3A:
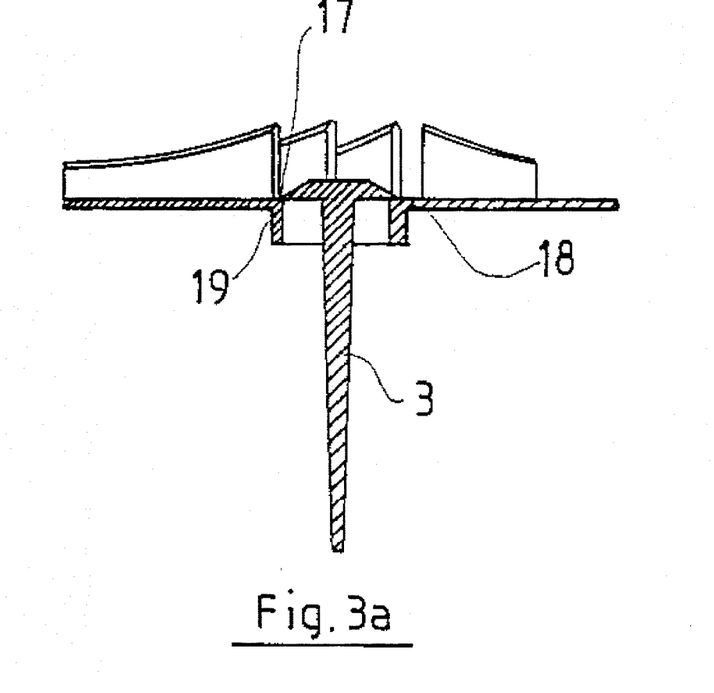
FIG. 3a is a sectional view of a second embodiment of a bottom part of the pump rotor.
Figure 3B:
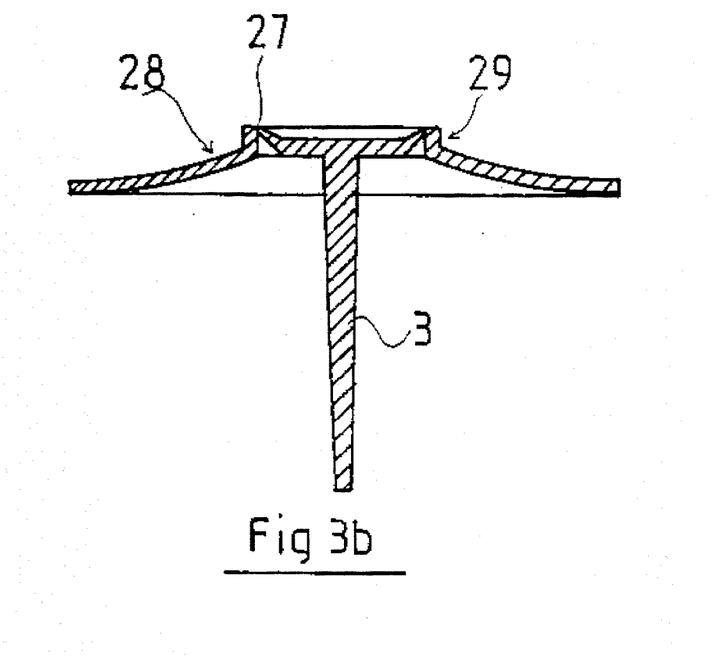

As shown in FIGS. 2a and 2b, as well as in FIGS. 3a and 3b which show a variant embodiment of these two same constituent parts of a pump rotor in accordance with the invention, these two parts are obtained by injection molding with precision molds of a thermoplastic material of high mechanical strength and of great fluidity so that the parts can be injected to have walls of slight thicknesses, that is to say on the order of a millimeter or less. The material used must retain its mechanical properties at high temperature and, if possible, have a chemical resistance which is adapted to the fluid to be propelled by the pump or to its environment (oils, greases of the mechanical system, hydrocarbons, and the like). A material selected from the following list is preferably used, this list being given by way of illustration but not exhaustively or by way of limitation:

polyamides (6,6 or 6,10 or 6,4 or 11,12)
polyarylamides
polyetheretherketones or polyetherketones
polyphenylene sulfides
polypropylenes
polyphthalamides.

In all cases a material that is preferred is filled with between 10% and 60% or more by weight of glass fibers or Kevlar fibers or else with carbon fibers, or else other fillers of this type which are well known in the art of injectable filled thermoplastic materials.

With a material of this type, it is easily possible to produce by injection parts having the desired slight wall thicknesses, namely on the order of a millimeter or less. Now, it is well known that upon the molding of filled materials of this type, a layer of materials formed essentially of resin of very specific mechanical and physical properties is formed in contact with the surface of the mold cavity upon the cooling of the material and, therefore, upon its hardening in contact with the mold. This phenomenon, which is well known to the person skilled in the art and is known as the skin effect, takes place on the surface of the cavity, which, in order to control it, must be adjusted to a temperature which is optimum for the type of material used, in order to be able to guarantee its structure. Due to the slight thicknesses of the parts thus obtained, one will benefit relatively more from the specific qualities inherent in this surface layer which is present on the two faces of the part and the mechanical and physical qualities which are of particular interest for the application contemplated here.

The injection of the bottom 1 and the cover 2 will be effected in a conventional manner through a channel 3 coaxial with the circular parts and feeding the cavity in question in such a manner as to assume a symmetrical, radial flow of the injected material. This injection can be effected, as is illustrated in FIGS. 2a and 2b, through multiple injection points such as 17, distributed in sufficient number over the periphery 13 of the bottom 1 or over the inner ring 22 of the cover 2, in such a manner that the paths of the material are relatively short up to the lines where the layers join each other, thus assuring a welding with material which is still hot and therefore has good mechanical properties. In this case, vents will be provided at the each of the weld lines to avoid the phenomenon of overheating at the exact location where the air and the gases contained in the cavity must be evacuated.

However, this injection can also be effected, as shown in FIGS. 3a and 3b, through a diffusion layer of the material, created by a flow striction zone (18 or 28) around a central ring of the part (19 or 29), which ring is itself fed by one or more injection points in a conventional manner. As previously, vents will, of course, be provided at suitable places in order to permit the evacuation of the air and gases from the cavity and avoid local overheating, as is well known in the art of injection molding.

Figure 4A:
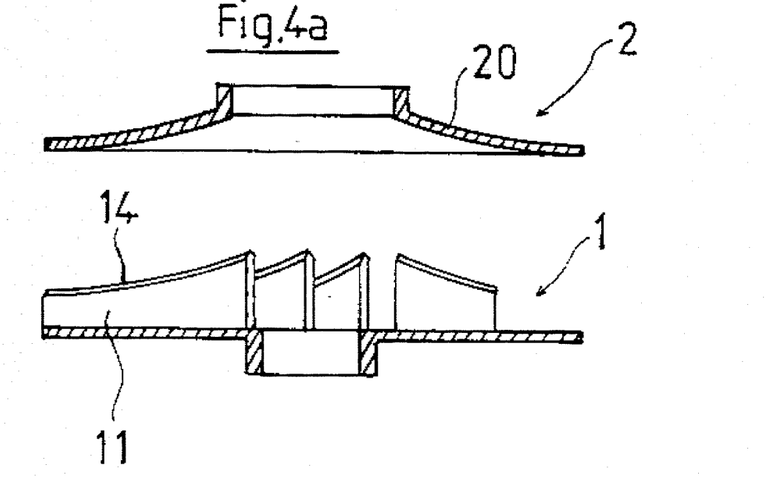
FIG. 4a is a diagrammatic view of a bottom part and a cover before their assembly by ultrasonic welding.
Figure 4B:
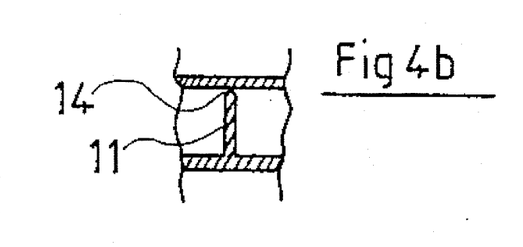
FIG. 4b is an illustration of an energy director, for the ultrasonic welding.
Figure 4C:
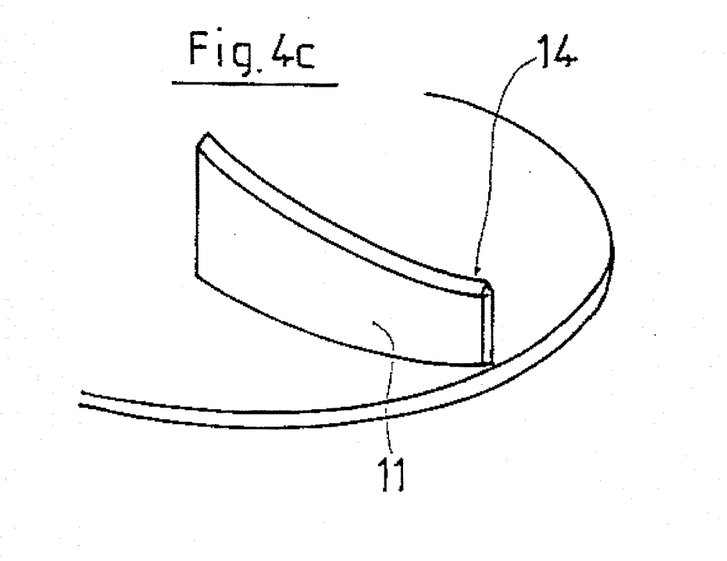
FIG. 4c is a perspective view of a blade provided with the energy director of FIG. 4b.
Figure 5:
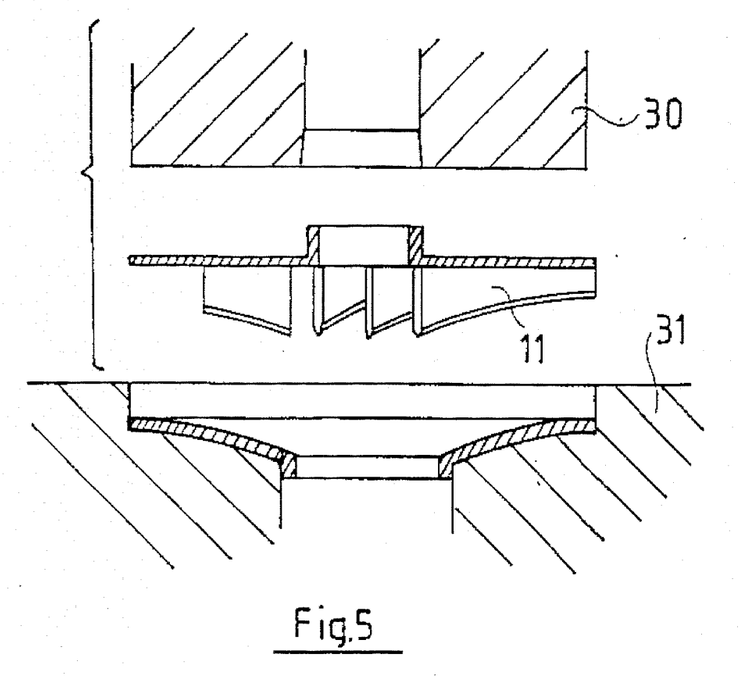
FIG. 5 is a diagrammatic view of an ultrasonic welding device.
Figure 6:
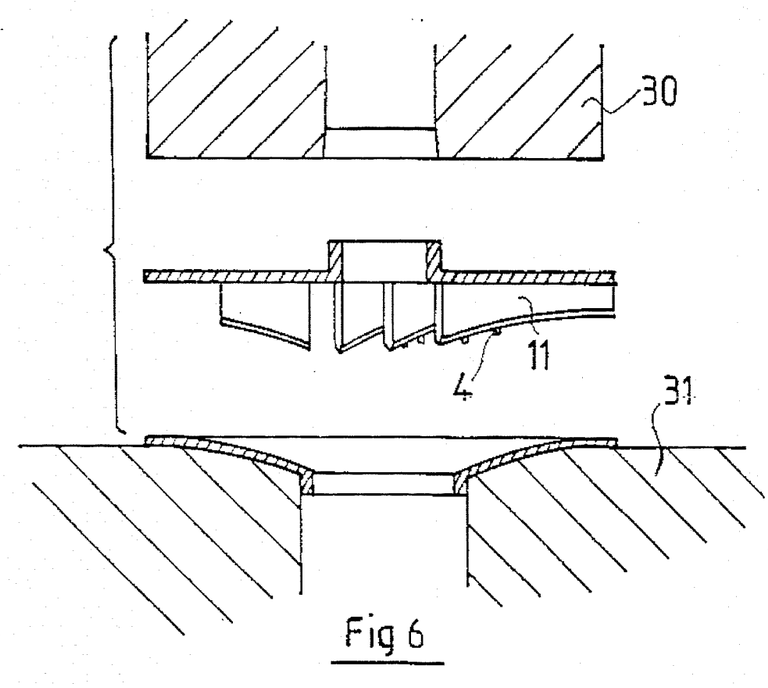
FIG. 6 is a diagrammatic view of a variant assembly used for ultrasonic welding.

The two parts thus obtained, namely the bottom 1 and the cover 2, will then be assembled by the technique of ultrasonic welding, as illustrated in FIGS. 4, 5 and 6.

The choice of a material of one of the types cited above or similar type, as well as the slight wall thicknesses obtained, in particular for the cover 2, and the slight geometrical deformations obtained in view of the symmetry of the injection system used, in addition to the surface qualities of the parts resulting from the skin effect described above, make it possible to effect, by assembly of the two parts, an ultrasonic welding with a triangular energy director on a flat or continuous surface, as shown in FIGS. 4a, 4b and 4c.

A bead of triangular section will be arranged on the upper edge 14 of each blade 11 in order to come in contact with the cover 2 flat and along its curvature, as is well known in the art of ultrasonic welding. As conventional, and as illustrated in the assembled rotor in FIG. 1b, the bead of triangular section on the upper edge 14 of each blade 11 disappears and is not present in the completed rotor with the bottom welded to the cover. This simple arrangement, which is possible due to the slight wall thicknesses used and the conformability thus obtained for the cover 2, avoids the use of more traditional known methods such as nesting, which are much more difficult to carry out. The centering of the cover 2 on the bottom 1 will be effected during assembly by welding in accordance with the customary methods. That is, centering is performed by positioning imposed by the support of each part in the sonotrode 30 and in the anvil 31 as shown diagrammatically in FIG. 5, or else by a relative positioning of the two parts controlled by nestings in reduced number formed on the two parts, such as the centering parts 4 shown diagrammatically in FIG. 6.

Figure 7:
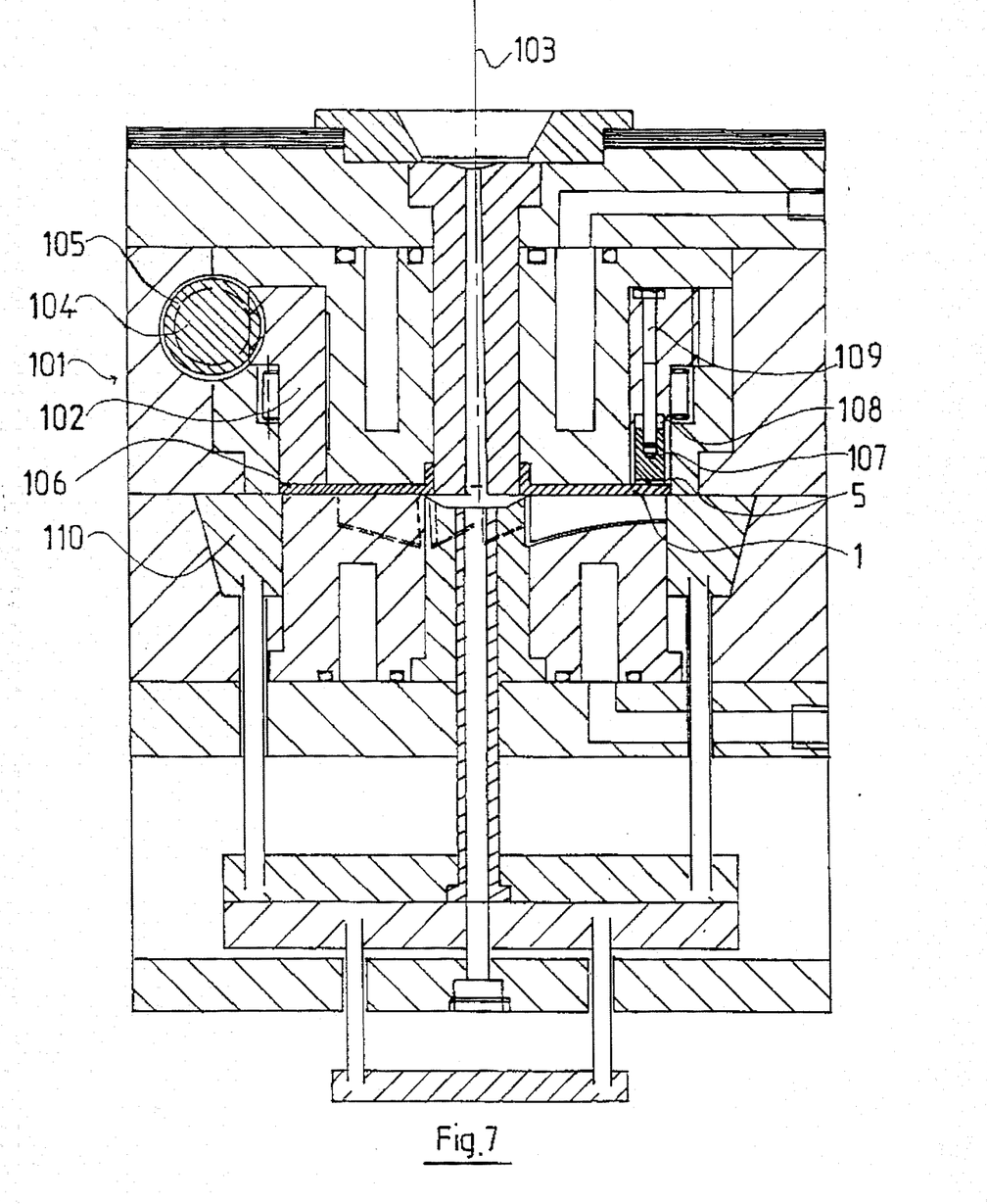
FIG. 7 is a sectional view through a mold for a bottom part including a balancing weight.

The rotor thus formed by assembly of the bottom 1 and the cover 2 must be able to rotate at high speeds. Therefore, it is necessary to assure its balancing in order to avoid vibrations. In order to obtain a perfect balancing of each part in series manufacture, a balancing weight 5, shown in FIG. 7, is formed on each of the bottom 1 and the cover 2 during molding. FIG. 7 shows the injection mold for the bottom 1 including the blades 11. It should be understood that the principle which is described here for the molding of the bottom 1 is applicable in its entirety in the same way to the molding of the cover 2. In this figure, it can be seen that the upper part 101 of this mold has a movable ring 102 which can turn around the central axis 103 of the part and of the mold, being guided with respect to the fixed part of the mold by, for instance, rollers. At its upper part, the movable ring 102 is equipped with a peripheral tooth 104 which meshes with a corresponding suitable worm 105 arranged in the fixed part of the upper half mold 101.

FIG. 2a shows a respective balancing weight 5 on the base and FIG. 2b shows it on the cover. FIG. 7 shows that the weight 5 is a small diameter circular disk out toward the periphery of the bottom or the cover, and this is depicted in FIGS. 2a and 2b.

In a suitable region of its periphery, the movable ring 102, the lower part 106 of which forms the mold cavity for the outer ring of the lower face of the disk 10 of the bottom 1, bears a cap 107 which is displaceable vertically along an axis parallel to the principal axis 103, practically without appreciable play, in a corresponding borehole 108 in the ring 102. This cap 107 is screwed on a threaded rod 109 integral with the ring 102 emerging into the borehole 108. The lower face of the cap 107 bears a screwdriver notch or a spur or the like, making it possible to turn it as desired with a suitable tool when the mold is open, and thus to modify its height with respect to the plane of the lower part 106 of the ring 102, forming the lower face of the outer ring of the mold cavity of the bottom 1.

It will thus be easily understood that, upon the molding of the part, whether it be the bottom 1 or the cover 2, a weight 5 can be formed on the lower face of the disk 10 of the bottom 1 or on the upper face of the cover 2. The height of the weight 5, and therefore the mass, can be modified by changing the vertical position of the cap 107 with respect to the lower plane 106 of the ring 102. Also, the angular position of the weight 5 can be modified by moving the worm 105 which turns the movable ring 102 therefore the axis bearing the rod 109 to the end of which the cap 107 is fastened.

Immediately after the emergence of a part, whether it be the bottom 1 or the cover 2, from the mold, one then proceeds with a verification of the balance on a suitable machine and, depending on the results obtained, modifies from the outside of the mold, without any disassembly, the angular position and/or mass of the weight 5 so as to obtain a satisfactory balancing of the part. Series production can therefore be effected and it is sufficient to verify by a conventional sequential sampling that the balance of the part is retained with time. The two molded parts, the bottom 1 and the cover 2, which are suitably marked and assembled then are combined to form balanced rotors.

The embodiment of pump rotors thus described can obviously give rise to numerous variants in execution without going beyond the scope of the present invention. Thus, it is possible, for instance, to produce the two component parts, namely the bottom 1 and the cover 2, of two different materials, either for technical and functional reasons or for reasons of economy and cost of material, or for both reasons simultaneously. One can, for example, use a material of higher temperature resistance for the bottom and a less expensive material for the cover, it being understood that it is in all cases necessary for these materials to be compatible with each other for welding by ultrasonics.

In the same way, the general shape and number of blades 11 integral with the bottom 1 can be extremely variable, depending on the type of application contemplated, in particular the nature of the fluid to be propelled and the pressure head to be obtained.

Similarly, the shape and the position, on each of the two component parts, of the balancing weight 5 formed during molding can be modified to a large extent without going beyond the scope of the present invention.

I claim:
1. A pump rotor for displacing fluids, comprising:
   a bottom formed of a first thermoplastic material and having a plurality of blades; and
   a cover formed of a second thermoplastic material and connected to the bottom; wherein
   the first and second thermoplastic materials are different from each other.
2. A pump rotor according to claim 1, wherein the bottom and the cover are connected to each other by an ultrasonic weld.
3. A pump rotor for displacing fluids, the rotor comprising:
   a rotor bottom including a wall and a plurality of blades upstanding from the wall, the blades having an upper edge;
   a cover disposed on and welded to the upper edge of the upstanding blades;
   the bottom including the blades and the cover being injection molded thermoplastic materials, wherein the wall of the bottom, the blades and the cover are molded with a thickness on the order of at most 1 mm in order to benefit from surface qualities of molded material related to the skin effect;
   at least one of the bottom and the cover of the rotor including a balancing weight molded thereon for balancing the bottom and the cover with reference to each other and for thereby balancing the motor.
4. The pump rotor of claim 3, wherein each of the bottom and the cover includes a respective balancing weight molded thereon for balancing the bottom and the cover with reference to each other and for balancing the rotor.
5. A pump rotor according to claim 3, wherein before the welding of the bottom to the cover, the upper edge of each blade includes an energy director in the form of a bead of triangular section, wherein the energy director is shaped to direct the bonding energy of an ultrasonic weld during the welding of the cover to the blades.

6. A pump rotor according to claim 3, wherein the thermoplastic material is selected from the group consisting of polyamides, polyarylamides, polyetheretherketones, polyetherketones, polyphenylene sulfides, polypropylenes, and polyphthalamides, the thermoplastic material being reinforced by a filler material consisting of between about 10% and 60% by weight of at least one of glass fibers, Kevlar fibers, and carbon fibers.

7. A pump rotor according to claim 3, wherein the bottom and the cover are made of two different thermoplastic materials.

8. A pump rotor according to claim 3, further comprising an annular ring located on outer edge of the bottom and shaped to engage an annular ejector formed in a mold to facilitate extraction of the bottom from the mold after an injection molding process is complete.

* * * * *